US012454440B2

(12) United States Patent
Hattori

(10) Patent No.: US 12,454,440 B2
(45) Date of Patent: Oct. 28, 2025

(54) MAINTENANCE DEVICE AND ELEVATOR DEVICE

(71) Applicant: Mitsubishi Electric Corporation, Tokyo (JP)

(72) Inventor: Tomohiro Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1365 days.

(21) Appl. No.: 15/734,230

(22) PCT Filed: Jun. 14, 2018

(86) PCT No.: PCT/JP2018/022806

§ 371 (c)(1),
(2) Date: Dec. 2, 2020

(87) PCT Pub. No.: WO2019/239561

PCT Pub. Date: Dec. 19, 2019

(65) Prior Publication Data

US 2021/0214187 A1 Jul. 15, 2021

(51) Int. Cl.
*B66B 5/00* (2006.01)
*B66B 1/34* (2006.01)

(52) U.S. Cl.
CPC .......... *B66B 5/0025* (2013.01); *B66B 1/3407* (2013.01)

(58) Field of Classification Search
CPC ............................ B66B 5/0025; B66B 1/3407
USPC .......................................................... 187/247
See application file for complete search history.

(56) References Cited

U.S. PATENT DOCUMENTS 4,568,909 A * 2/1986 Whynacht ............ B66B 5/0037 187/393
4,749,062 A * 6/1988 Tsuji ....................... B66B 3/008 715/765
4,771,865 A * 9/1988 Hinderling ............ B66B 5/0037 187/391
5,056,629 A * 10/1991 Tsuji ....................... B66B 3/008 187/397

(Continued)

FOREIGN PATENT DOCUMENTS

CN 104671024 A * 6/2015 ........... B66B 5/0037
CN 104854531 B * 5/2018 ............... G06F 1/04

(Continued)

OTHER PUBLICATIONS

International Search Report and Written Opinion mailed on Aug. 21, 2018, received for PCT Application No. PCT/JP2018/022806, filed on Jun. 14, 2018, 7 pages including English Translation.

(Continued)

*Primary Examiner* — Christina M Schreiber
(74) *Attorney, Agent, or Firm* — XSENSUS LLP

(57) ABSTRACT

A maintenance device (18) includes, for example, a clock (20), a clock (21), a selection unit (23), and a recording unit (25). The clock (20) outputs time information. The clock (21) outputs time information. The selection unit (23) selects at least one of the clock (20) or the clock (21) as a clock to be used. The recording unit (25) records elevator information by adding time information from the selected clock to the elevator information. The selection unit (23) selects the clock to be used according to the content of the elevator information to be recorded by the recording unit (25).

24 Claims, 5 Drawing Sheets

No 7: TELEPHONE

(56) References Cited

U.S. PATENT DOCUMENTS

| | | | | |
|---|---|---|---|---|
| 6,021,870 | A * | 2/2000 | Kim | B66B 1/34<br>187/397 |
| 9,213,473 | B2 * | 12/2015 | Hovi | G06F 3/0484 |
| 2008/0230325 | A1 * | 9/2008 | Chida | B66B 5/0031<br>187/393 |
| 2009/0038890 | A1 * | 2/2009 | Kawai | B66B 7/00<br>700/275 |
| 2017/0066625 | A1 * | 3/2017 | Shiratsuki | B66B 5/0018 |
| 2021/0214187 | A1 * | 7/2021 | Hattori | B66B 5/0018 |

FOREIGN PATENT DOCUMENTS

| | | | | |
|---|---|---|---|---|
| JP | H07315707 | A * | 12/1995 | |
| JP | H08119553 | A * | 5/1996 | |
| JP | H1036016 | A * | 2/1998 | |
| JP | 2004189358 | A * | 7/2004 | |
| JP | 2004250116 | A * | 9/2004 | |
| JP | WO2005105646 | A1 * | 9/2007 | B66B 5/0031 |
| JP | 6010185 | B1 * | 10/2016 | |
| JP | 2017001773 | A * | 1/2017 | |
| WO | WO-2005105646 | A1 * | 11/2005 | B66B 5/0031 |

OTHER PUBLICATIONS

Office Action issued May 27, 2021 in India Patent Application No. 202047052590, 5 pages.

* cited by examiner

No. 7: TELEPHONE

No. 4 : COMMUNICATION DEVICE
No. 17: CONTROLLER
No. 20: CLOCK
No. 21: CLOCK
No. 22: PROCESSING UNIT
No. 23: SELECTION UNIT
No. 24: TIME ADJUSTMENT UNIT
No. 25: RECORDING UNIT
No. 26: TRANSMISSION UNIT
No. 27: OPERATION CONTROL UNIT

S101: ARE RECORDING CONDITIONS SATISFIED?
S102: SELECT CLOCK TO BE USED
S103: RECORD ELEVATOR INFORMATION

S201: ARE TRANSMISSION CONDITIONS SATISFIED?
S202: SELECT CLOCK TO BE USED
S203: TRANSMIT ELEVATOR INFORMATION

S301: SELECT CLOCK TO BE USED
S302: ARE START CONDITIONS SATISFIED?
S303: START SPECIFIC OPERATION

MAINTENANCE DEVICE AND ELEVATOR DEVICE

CROSS-REFERENCE TO RELATED APPLICATION

The present application is based on PCT filing PCT/JP2018/022806, filed Jun. 14, 2018, the entire contents of which are incorporated herein by reference.

FIELD

The present invention relates to a maintenance device and an elevator device.

BACKGROUND

PTL 1 describes a system for monitoring an elevator. In the system described in PTL 1, when a signal indicating the standard time is received, a clock is adjusted according to the received signal.

CITATION LIST

Patent Literature

[PTL1] JP 2004-250116 A

SUMMARY

Technical Problem

In the system described in PTL 1, a clock is adjusted according to the standard time. Therefore, functions, such as transmission of data, are performed on the basis of the standard time.

However, when an elevator device is installed in a building, there may be a case where the owner of the building requests a specific function to be performed according to a clock for building management. There may also be a case where an external institution requests a specific function to be performed according to a clock designated by the institution. In the system described in PTL 1, only one clock is provided. Thus, it has been impossible to respond to such requests.

The present invention is made in order to solve the foregoing problem. An object of the present invention is to provide a maintenance device that can implement a specific function using a plurality of clocks, and an elevator device including such a maintenance device.

Solution to Problem

A maintenance device of the present invention comprises a plurality of clocks that output time information, selection means for selecting at least one of the plurality of clocks as a clock to be used, and recording means for recording elevator information by adding time information from the selected clock to the elevator information. The selection means selects the clock to be used according to a content of the elevator information to be recorded by the recording means.

A maintenance device of the present invention comprises a plurality of clocks that output time information, selection means for selecting at least one of the plurality of clocks as a clock to be used, and transmission means for transmitting elevator information by adding time information from the selected clock to the elevator information. The selection means selects the clock to be used according to a content of the elevator information to be transmitted by the transmission means.

A maintenance device of the present invention comprises a plurality of clocks that output time information, selection means for selecting one of the plurality of clocks as a clock to be used, and operation control means for starting a specific operation related to a service or maintenance of an elevator according to time information from the selected clock. The selection means selects the clock to be used according to a content of the specific operation to be performed by the operation control means.

An elevator device of the present invention comprises a car that moves in a shaft, a controller that controls movement of the car, the maintenance device being connected to the controller, and a communication device connected to the maintenance device.

Advantageous Effects of Invention

The maintenance device according to the present invention includes, for example, a plurality of clocks, selection means, and recording means. The selection means selects a clock to be used according to the content of elevator information to be recorded by the recording means. The recording means records the elevator information by adding thereto time information from the selected clock. According to such a maintenance device, recording of elevator information can be performed using a plurality of clocks.

DESCRIPTION OF EMBODIMENTS

Figure 1:
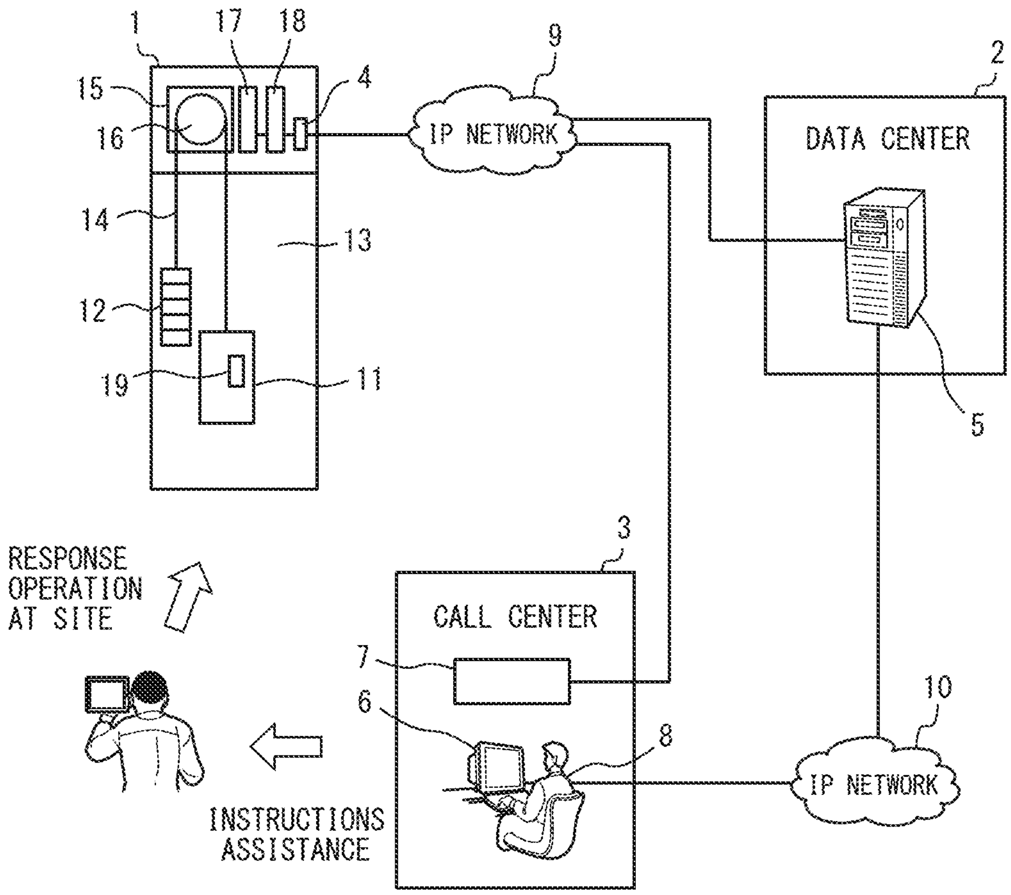
FIG. 1 is a diagram illustrating an example of a system including an elevator device according to a first embodiment.

The present invention will be described with reference to the accompanying drawings. Redundant descriptions will be simplified or omitted as appropriate. In each drawing, identical reference numerals denote identical portions or corresponding portions.

First Embodiment

FIG. 1 is a diagram illustrating an example of a system including an elevator device 1 according to a first embodiment. The elevator system illustrated in FIG. 1 includes, for example, the elevator device 1, a data center 2, and a call center 3. The elevator device 1 includes a communication device 4 for communicating with the outside. The data center 2 includes a server 5. The call center 3 includes a monitoring terminal 6 and a telephone 7. The monitoring terminal 6 and the telephone 7 are used by an operator 8.

The elevator device 1 communicates with the data center 2 via, for example, an IP network 9. The communication device 4 is connected to the server 5 via the IP network 9. The elevator device 1 communicates with the call center 3 via, for example, the IP network 9. The communication device 4 is connected to the telephone 7 via the IP network 9. The call center 3 communicates with the data center 2 via, for example, an IP network 10. The monitoring terminal 6 is connected to the server 5 via the IP network 10.

In the present embodiment, each IP network is a communication network that uses the IP (Internet Protocol) as a communication protocol. For example, the IP network 9 is a closed network. The IP network 10 is a closed network. Instead of the IP networks 9 and 10, open networks may also be used.

FIG. 1 illustrates an example in which the data center 2 and the call center 3 are located in remote places. The server 5, the monitoring terminal 6, and the telephone 7 may be included in a single center. When the data center 2 and the call center 3 are located in remoted places, the call center 3 is preferably provided in a country where the elevator device 1 is provided. For example, the call center 3 is provided in each region where the elevator device 1 is provided. The call center 3 may be provided in a region different from the region where the elevator device 1 is provided. For example, a single call center 3 may communicate with the elevator devices 1 provided in a plurality of regions.

The data center 2 need not be provided in a region where the elevator device 1 is provided. The data center 2 may be provided in a region where the elevator device 1 is provided or be provided in a region different from the region where the elevator device 1 is provided. In addition, the data center 2 need not be provided in a country where the elevator device 1 is provided. The data center 2 may be provided in a country where the elevator device 1 is provided or be provided in a country different from the country where the elevator device 1 is provided. For example, the server 5 provided in Japan may communicate with the elevator devices 1 provided in different countries.

The elevator device 1 includes, for example, a car 11 and a counterweight 12. The car 11 moves up and down in a shaft 13. The car 11 and the counterweight 12 are hung by a main rope 14 in the shaft 13. The main rope 14 is wound on a driving sheave 16 of a traction machine 15. The traction machine 15 is controlled by a controller 17. That is, the controller 17 controls the movement of the car 11. A maintenance device 18 is connected to the controller 17. The communication device 4 is connected to the maintenance device 18.

In the example illustrated in FIG. 1, the car 11 is provided with an interphone 19. The interphone 19 is a device for a passenger in the car 11 to talk with the operator 8 in the call center 3.

Figure 2:
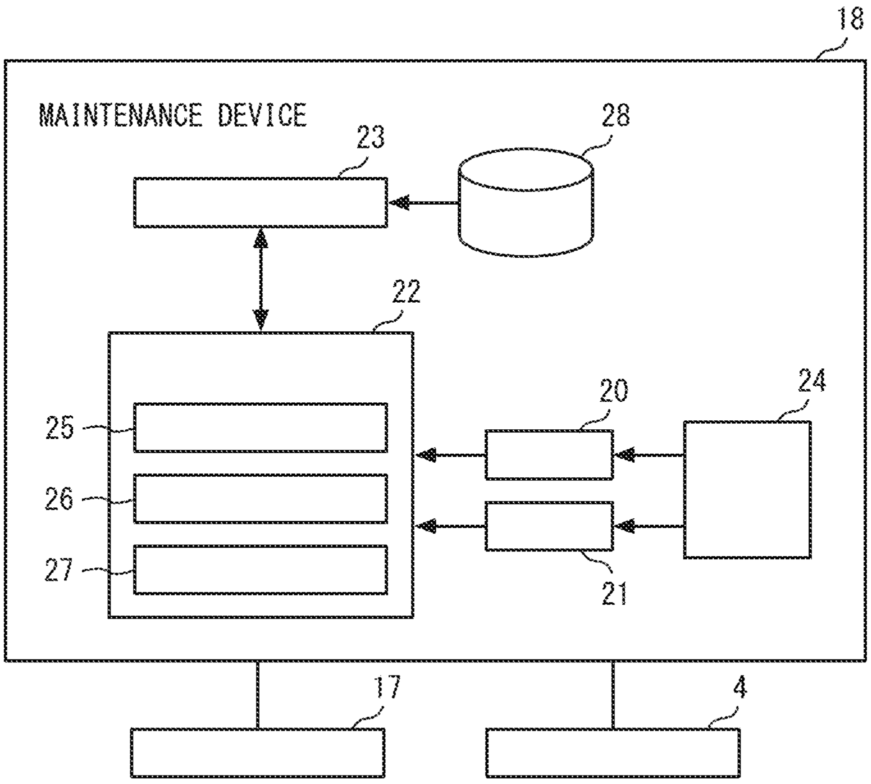
FIG. 2 is a diagram illustrating an example of a maintenance device.

FIG. 2 is a diagram illustrating an example of the maintenance device 18. As illustrated in FIG. 2, the maintenance device 18 includes, for example, a clock 20, a clock 21, a processing unit 22, a selection unit 23, and a memory unit 28.

The clock 20 outputs time information. The clock 21 outputs time information. The clock 20 outputs, for example, information representing "year, month, date, hours, minutes, seconds" as the time information. Similarly, the clock 21 outputs information representing "year, month, date, hours, minutes, seconds" as the time information. When the clock 20 outputs information representing "year, month, date, hours, minutes, seconds" as the time information, the clock 21 may output as the time information an offset value for the time information from the clock 20. When the clock 21 outputs information representing "year, month, date, hours, minutes, seconds" as the time information, the clock 20 may output as the time information an offset value for the time information from the clock 21. The offset value may be time difference information, for example.

FIG. 2 illustrates an example in which the maintenance device 18 includes two clocks as the simplest example. The maintenance device 18 may include three or more clocks. Each clock included in the maintenance device 18 outputs time information.

The maintenance device 18 has various functions necessary to perform maintenance of the elevator. Each function of the maintenance device 18 is implemented by the processing unit 22. It should be noted that some of the functions of the maintenance device 18 need time information. In the present embodiment, the functions of the maintenance device 18 that need time information will be described in detail.

The processing unit 22 includes, for example, a recording unit 25, a transmission unit 26, and an operation control unit 27. The recording unit 25 is an exemplary means for implementing a function that needs time information. The recording unit 25 records information on the elevator by adding time information thereto. The recording unit 25 may record the information on either the maintenance device 18 or the controller 17. In the following description, information on the elevator may also be simply referred to as elevator information. The transmission unit 26 is an exemplary means for implementing a function that needs time information. The transmission unit 26 transmits elevator information to the outside by adding time information thereto. For example, transmission of information by the transmission unit 26 is performed via the communication device 4. The operation control unit 27 is an exemplary means for implementing a function that needs time information. The operation control unit 27 starts a specific operation related to a service or maintenance of the elevator according to time information. In the following description, a specific operation related to a service or maintenance of the elevator is also simply referred to as a specific operation.

Figure 3:
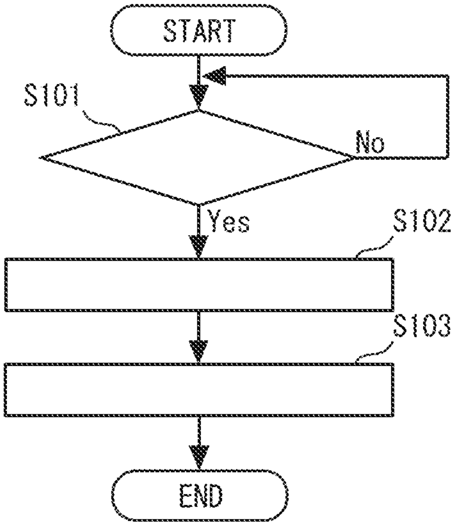
FIG. 3 is a flowchart illustrating an exemplary operation of the maintenance device.

Hereinafter, the functions of the maintenance device 18 will be described in detail with also reference to FIGS. 3 to 5. FIG. 3 is a flowchart illustrating an exemplary operation of the maintenance device 18.

In the maintenance device 18, it is determined if recording conditions are satisfied (S101). The recording conditions are the conditions for the recording unit 25 to start a process of recording elevator information. The recording conditions are set in advance. As an example, the recording conditions are satisfied when the maintenance device 18 receives a specific content of elevator information from the controller 17.

When the recording conditions are satisfied, the selection unit 23 selects a clock to be used by the recording unit 25 in performing a recording process (S102). In the following description, a clock selected by the selection unit 23 is also referred to as a clock to be used. In S102, the selection unit 23 selects at least one of the clocks included in the maintenance device 18 as a clock to be used. In the example illustrated in the present embodiment, the selection unit 23 selects the clock 20 or the clock 21 as a clock to be used. The selection unit 23 may also select both the clock 20 and the clock 21 as clocks to be used. For example, the selection unit 23 selects a clock to be used according to the content of elevator information to be recorded by the recording unit 25.

The memory unit 28 stores a table for the selection unit 23 to select a clock to be used. In the following description, such a table is also referred to as a selection table. For example, in the selection table, information on a clock to be used is registered for each content of elevator information that should be recorded together with time information. In such a case, the selection unit 23 selects a clock to be used in S102 on the basis of the content of the elevator information to be recorded as well as the selection table. Table 1 illustrates an example of the selection table.

TABLE 1

| Content of Elevator Information | Clock 20 | Clock 21 |
|---|---|---|
| Power Supply Off | ✓ | |
| Failure of Circuit Board | | ✓ |
| Light Bulb Burned Out | ✓ | ✓ |
| . | . | . |
| . | . | . |
| . | . | . |

For example, suppose a case where the memory unit 28 stores the selection table illustrated in Table 1. In such a case, if the recording unit 25 records information indicating that a power supply of the elevator device 1 has been turned off, the selection unit 23 selects the clock 20 as a clock to be used. If the recording unit 25 records information indicating that a failure has occurred in a particular circuit board included in the elevator device 1, the selection unit 23 selects the clock 21 as a clock to be used. If the recording unit 25 records information indicating that a light bulb of a lighting device included in the car 11 has burned out, the selection unit 23 selects both the clock 20 and the clock 21 as clocks to be used.

The recording unit 25 records the elevator information by adding thereto time information from the clock selected by the selection unit 23 (S103), For example, when the selection unit 23 selects the clock 20 as a clock to be used, the recording unit 25 performs a recording process by adding time information from the clock 20 to the elevator information. When the selection unit 23 selects the clock 21 as a clock to be used, the recording unit 25 performs a recording process by adding time information from the clock 21 to the elevator information. When the selection unit 23 selects both the clock 20 and the clock 21 as clocks to be used, the recording unit 25 performs a recording process by adding time information from the clock 20 and time information from the clock 21 to the elevator information.

In the example illustrated in FIG. 3, recording of elevator information can be performed using a plurality of clocks. For example, the clock 20 is set to a clock for building management. The clock 21 is set to a clock for maintenance of the elevator device 1. When the elevator information that is necessary for maintenance is recorded together with time information from the clock 21, it is possible for a maintenance staff to, for example, when analyzing a failure later, easily perform the analysis process. For example, even when the clock for building management is wrong, pieces of elevator information that are necessary for analyzing a failure can be arranged in time series. In addition, when the elevator information that is necessary for building management is stored together with time information from the clock 20, it is possible to centrally handle the elevator information and management information from other systems, for example, for management of the building.

The clock 20 or the clock 21 may also be set to a clock designated by, for example, an external institution. In addition, the maintenance device 18 may also include a third clock, which may be set to a clock designated by an external institution. Examples of the external institution include an institution related to the elevator, a local government institution, and a national government institution. In such a case, the external institution is able to centrally handle the elevator information and information from other systems.

Figure 4:
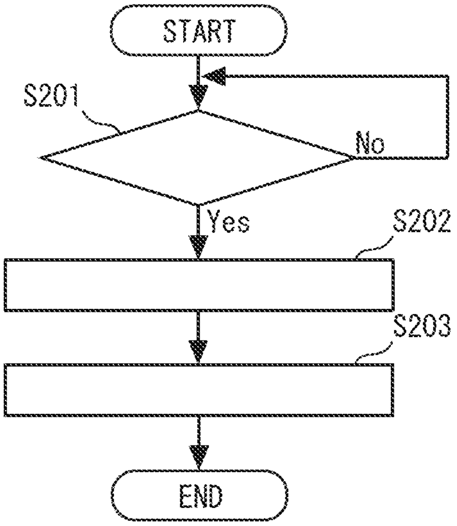
FIG. 4 is a flowchart illustrating another exemplary operation of the maintenance device.

FIG. 4 is a flowchart illustrating another exemplary operation of the maintenance device 18. In the example illustrated in FIG. 4, the maintenance device 18 determines if transmission conditions are satisfied (S201). The transmission conditions are the conditions for the transmission unit 26 to start a process of transmitting elevator information. The transmission conditions are set in advance. As an example, the transmission conditions are satisfied when the maintenance device 18 receives a specific content of elevator information from the controller 17. When the maintenance device 18 receives a specific content of elevator information from the controller 17, both the recording conditions and the transmission conditions may be satisfied.

When the transmission conditions are satisfied, the selection unit 23 selects a clock to be used by the transmission unit 26 in performing a transmission process (S202). In S202, the selection unit 23 selects at least one of the clocks included in the maintenance device 18 as a clock to be used. In the example illustrated in the present embodiment, the selection unit 23 selects the clock 20 or the clock 21 as a clock to be used. The selection unit 23 may also select both the clock 20 and the clock 21 as clocks to be used. For example, the selection unit 23 selects a clock to be used according to the content of elevator information to be transmitted by the transmission unit 26.

For example, in the selection table, information on a clock to be used is registered for each content of elevator information that should be transmitted together with time information. In such a case, the selection unit 23 selects a clock to be used in S202 on the basis of the content of the elevator information to be transmitted as well as the selection table. Table 2 illustrates another example of the selection table.

TABLE 2

| Content of Elevator Information | Clock 20 | Clock 21 |
|---|---|---|
| Power Supply Off | ✓ | |
| Failure of Circuit Board | | ✓ |
| Passenger(s) Trapped in Car | ✓ | ✓ |
| . | . | . |
| . | . | . |
| . | . | . |

For example, suppose a case where the memory unit 28 stores the selection table illustrated in Table 2. In such a case, if the transmission unit 26 transmits information indicating that a power supply of the elevator device 1 has been turned off, the selection unit 23 selects the clock 20 as a clock to be used. If the transmission unit 26 transmits information indicating that a failure has occurred in a particular circuit board included in the elevator device 1, the selection unit 23 selects the clock 21 as a clock to be used. If the transmission unit 26 transmits information indicating that a passenger is trapped in the car, the selection unit 23 selects both the clock 20 and the clock 21 as clocks to be used.

The transmission unit 26 transmits the elevator information by adding thereto time information from the clock selected by the selection unit 23 (S203), For example, when the selection unit 23 selects the clock 20 as a clock to be used, the transmission unit 26 performs a transmission process by adding time information from the clock 20 to the elevator information. When the selection unit 23 selects the clock 21 as a clock to be used, the transmission unit 26 performs a transmission process by adding time information from the clock 21 to the elevator information. When the selection unit 23 selects both the clock 20 and the clock 21 as clocks to be used, the transmission unit 26 performs a transmission process by adding time information from the clock 20 and time information from the clock 21 to the elevator information.

In the example illustrated in FIG. 4, transmission of elevator information can be performed using a plurality of clocks. For example, the clock 20 is set to a clock for building management. The transmission unit 26 transmits the elevator information together with time information from the clock 20 to a management office of the building via, for example, the communication device 4. The clock 21 is set to a clock for maintenance of the elevator device 1. The transmission unit 26 transmits the elevator information together with time information from the clock 21 to the server 5 via, for example, the communication device 4. The clock 20 or the clock 21 may also be set to a clock designated by, for example, an external institution. The maintenance device 18 may also include a third clock, which may be set to a clock designated by an external institution. Examples of the external institution include an institution related to the elevator, a local government institution, and a national government institution.

Figure 5:
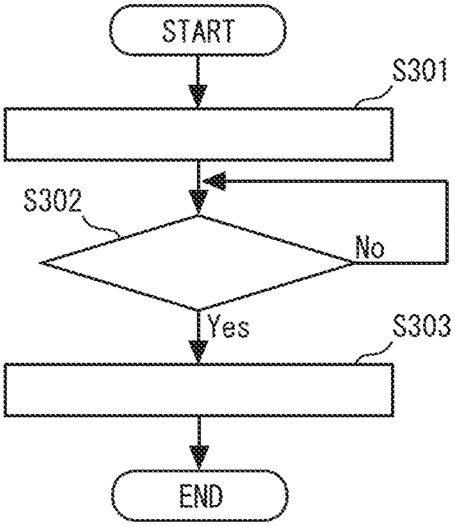
FIG. 5 is a flowchart illustrating another exemplary operation of the maintenance device.

FIG. 5 is a flowchart illustrating another exemplary operation of the maintenance device 18. In the example illustrated in FIG. 5, the selection unit 23 selects one of the clocks included in the maintenance device 18 as a clock to be used (S301). For example, the selection unit 23 selects the clock 20 as a clock to be used.

The operation control unit 27 determines if conditions for starting a specific operation are satisfied (S302). The operation control unit 27 performs the determination in S302 on the basis of time information from the clock selected by the selection unit 23. When the conditions for starting a specific operation are satisfied, the operation control unit 27 starts the specific operation (S303).

For example, in the selection table, information on a clock to be used and information on the start date and time are registered for each content of specific operations that should be started according to time information. Table 3 illustrates another example of the selection table.

TABLE 3

| Content of Specific Operations | Clock 20 | Clock 21 | Start Date and Time |
|---|---|---|---|
| Setting of Non-Service Floor | ✓ | | Monday to Friday, 7:00PM |
| Diagnosis Operation | | ✓ | First Sunday, 3:00AM |
| . | . | . | |
| . | . | . | |
| . | . | . | |

For example, suppose a case where the memory unit 28 stores the selection table illustrated in Table 3. In such a case, if the operation control unit 27 determines that the current time is 7:00 pm on Monday on the basis of the time information from the clock 20, for example, the operation control unit 27 starts setting of a non-service floor. The non-service floor is a floor on which the car 11 is prohibited from stopping. For example, when shops on the fifth floor of the building are closed at 7:00 pm while shops on the other floors are open even after 7:00 µm, the fifth floor is set as the non-service floor at 7:00 pm.

The maintenance device 18 performs the operation illustrated in FIG. 5 for each clock included in the maintenance device 18. For example, in S301, the selection unit 23 selects the clock 21 as a clock to be used. In such a case, the operation control unit 27 starts a specific operation according to time information from the clock 21. For example, if the operation control unit 27 determines that the current time is 3:00 am on the first Sunday on the basis of the time information from the clock 21, the operation control unit 27 starts a diagnosis operation.

In the example illustrated in FIG. 5, the selection unit 23 selects a clock to be used according to the content of a specific operation to be performed by the operation control unit 27. Then, the operation control unit 27 starts the specific operation according to time information from the clock selected by the selection unit 23. In the example illustrated in FIG. 5, execution of specific operations using a plurality of clocks is possible. For example, the clock 20 is set to a clock for building management. Accordingly, the operation of the elevator that is necessary for building management can be set to the operation performed with another system in the building. The clock 21 is set to a clock for maintenance of the elevator device 1. The clock 20 or the clock 21 may be set to a clock designated by, for example, an external institution. The maintenance device 18 may also include a third clock, which may be set to a clock designated by an external institution. Examples of the external institution include an institution related to the elevator, a local government institution, and a national government institution.

In addition, as illustrated in FIG. 2, the maintenance device 18 may further include a time adjustment unit 24. The time adjustment unit 24 adjusts the time of each clock of the maintenance device 18.

For example, the clock for building management is included in another system in the building. Time information output from the clock for building management is received by the communication device 4. The time adjustment unit 24 sets the time information to be output from the clock 20 to this time information received by the communication device 4. As another example, the controller 17 includes a master clock. The maintenance device 18 receives from the controller 17 time information output from the master clock. The time adjustment unit 24 sets the time information to be output from the clock 21 to this time information received from the controller 17.

As another example, time information from an external institution is received by the communication device 4. The time adjustment unit 24 may set the time information to be output from the clock 20 to this time information received by the communication device 4. The time adjustment unit 24 may set the time information to be output from the clock 21 to this time information received by the communication device 4. When the maintenance device 18 includes a third clock, the time adjustment unit 24 may set the time information to be output from the third clock to the time information from an external institution received by the communication device 4.

As another example, the time adjustment unit 24 may adjust both the time of the clock 20 and the time of the clock 21 on the basis of information received from the controller 17. For example, the controller 17 includes a first master clock and a second master clock. The maintenance device 18 receives from the controller 17 time information output from the first master clock. The time adjustment unit 24 sets the time information to be output from the clock 20 to the time information from the first master clock. In addition, the maintenance device 18 receives from the controller 17 time information output from the second master clock. The time adjustment unit 24 sets the time information to be output from the clock 21 to the time information from the second master clock.

As another example, the time adjustment unit 24 may adjust both the time of the clock 20 and the time of the clock 21 on the basis of information received by the communication device 4. As described above, time information output from the clock for building management is received by the communication device 4. The time adjustment unit 24 sets the time information to be output from the clock 20 to the time information received by the communication device 4. In addition, time information from an external institution is received by the communication device 4. The time adjustment unit 24 sets the time information to be output from the clock 21 to this time information received by the communication device 4.

As another example, the time adjustment unit 24 may adjust the time of the clock 20 or the time of the clock 21 on the basis of time information from a dedicated terminal owned by a maintenance staff. For example, the dedicated terminal is directly connected to the maintenance device 18. The time adjustment unit 24 sets the time information to be output from the clock 20 or the clock 21 to this time information from the dedicated terminal. The time adjustment unit 24 may adjust both the time of the clock 20 and the time of the clock 21 on the basis of the time information from the dedicated terminal.

Described next is an example in which there is a time difference between a region where the elevator device 1 is provided and a region where the call center 3 is provided. For example, when a passenger becomes trapped in the car 11, he/she calls up the operator 8 in the call center 3 via the interphone 19. The operator 8 talks with the passenger in the car 11 over the telephone 7. In addition, the operator 8 causes an indicator of the monitoring terminal 6 to display the elevator information on the elevator device 1 in which the passenger is trapped.

The elevator information displayed on the indicator of the monitoring terminal 6 is the elevator information stored in the server 5. The server 5 stores the elevator information transmitted from the elevator device 1. For example, the clock 20 may output, as the time information, time difference information between the region where the elevator device 1 is provided and the region where the call center 3 is provided. Accordingly, the elevator information related to the elevator device 1 in which a passenger is trapped can be displayed on the indicator of the monitoring terminal 6 together with the time information set to the time of the region where the call center 3 is provided, for example. In addition, when an operation instruction is transmitted from the call center 3 to the elevator device 1, the operation control unit 27 starts a specific operation according to the time information from the clock 20, that is, the time difference information. Accordingly, the operator 8 is able to transmit the operation instruction without considering the time difference between the region where the elevator device 1 is provided and the region where the call center 3 is provided.

Figure 6:
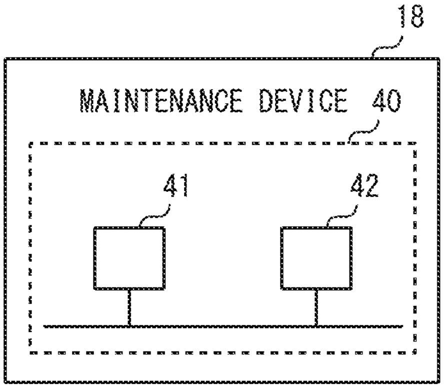
FIG. 6 is a diagram illustrating an example of hardware resources of the maintenance device.

In the present embodiment, units denoted by reference numerals 22 to 28 indicate the functions of the maintenance device 18. FIG. 6 is a diagram illustrating an example of hardware resources of the maintenance device 18. The maintenance device 18 includes processing circuitry 40 including, for example, a processor 41 and a memory 42 as hardware resources. The function of the memory unit 28 is implemented by the memory 42, for example. The maintenance device 18 implements the functions of the units denoted by reference numerals 22 to 27 by executing programs stored in the memory 42 with the processor 41.

The processor 41 is also referred to as a CPU, a central processing unit, a processing unit, an arithmetic unit, a microprocessor, a microcomputer, or a DSP. As the memory 42, a semiconductor memory, a magnetic disk, a flexible disk, an optical disc, a compact disc, a minidisc, or a DVD may be adopted. Examples of applicable semiconductor memories include RAM, ROM, flash memory, EPROM, and EEPROM.

Figure 7:
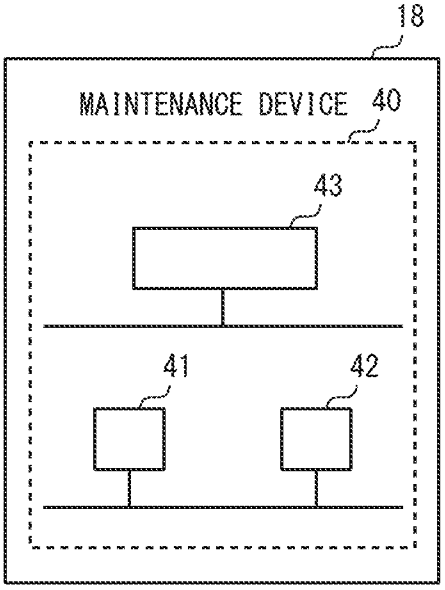
FIG. 7 is a diagram illustrating another example of hardware resources of the maintenance device.

FIG. 7 is a diagram illustrating another example of hardware resources of the maintenance device 18. In the example illustrated in FIG. 7, the maintenance device 18 includes processing circuitry 40 including, for example, a processor 41, a memory 42, and dedicated hardware 43, for example. FIG. 7 illustrates an example in which some of the functions of the maintenance device 18 are implemented by the dedicated hardware 43. All of the functions of the maintenance device 18 may be implemented by the dedicated hardware 43. As the dedicated hardware 43, a single circuit, a composite circuit, a programmed processor, a parallel-programmed processor, an ASIC, an FPGA, or a combination thereof can be adopted.

It should be noted that some of the functions of the maintenance device 18 may be provided in the controller 17. Alternatively, all of the functions of the maintenance device 18 may be provided in the controller 17. That is, the elevator device 1 may include the maintenance device 18 as a part of the controller 17.

INDUSTRIAL APPLICABILITY

The maintenance device according to the present invention is also applicable to the already-existing elevator devices.

REFERENCE SIGNS LIST

1 elevator device, 2 data center, 3 call center, 4 communication device, 5 server, 6 monitoring terminal, 7 telephone, 8 operator, 9 IP network, 10 IP network, 11 car, 12 counterweight, 13 shaft, 14 main rope, 15 traction machine, 16 driving sheave, 17 controller, 18 maintenance device, 19 interphone, 20 clock, 21 clock, 22 processing unit, 23 selection unit, 24 time adjustment unit, 25 recording unit, 26 transmission unit, 27 operation control unit, 28 memory unit, 40 processing circuitry, 41 processor, 42 memory, 43 dedicated hardware

The invention claimed is:

1. A maintenance device comprising:
   a plurality of clocks that each output time information; and
   circuitry configured to:
   select at least one of the plurality of clocks of the maintenance device as a clock to be used according to a content of elevator information; and
   record the elevator information in a memory by adding time information from the selected clock to the elevator information, wherein the elevator information is received from control circuitry.

2. The maintenance device according to claim 1, further comprising:

the memory to store a selection table, and wherein, in the selection table, information on a clock to be used is registered for the elevator information that should be recorded together with the time information.

3. The maintenance device according to claim 1, wherein the plurality of clocks include a first clock and a second clock, and the second clock outputs as time information an offset value for time information from the first clock.

4. The maintenance device according to claim 1, wherein the circuitry is configured to adjust a time of each of the plurality of clocks.

5. The maintenance device according to claim 1, wherein the plurality of clocks include a first clock and a second clock, and the circuitry is configured to set time information to be output from the first clock to time information received from a controller of an elevator, and set time information to be output from the second clock to time information received from an external institution that is external to the maintenance device.

6. An elevator device comprising:

a car that moves in a shaft;

a controller that controls movement of the car;

the maintenance device according to claim 1, the maintenance device being connected to the controller; and a communication device connected to the maintenance device.

7. The elevator device according to claim 6, wherein the circuitry is configured to adjust a time of each of the plurality of clocks.

8. The elevator device according to claim 6, wherein the plurality of clocks include a first clock and a second clock, and the circuitry is configured to set time information to be output from the first clock to time information received from the controller, and set time information to be output from the second clock to time information received from outside by the communication device that is external to the maintenance device.

9. A maintenance device comprising:

a plurality of clocks that each output time information; and circuitry configured to:

select at least one of the plurality of clocks of the maintenance device as a clock to be used according to a content of elevator information, wherein the elevator information is received from control circuitry; and transmit the elevator information to an external device by adding time information from the selected clock to the elevator information.

10. The maintenance device according to claim 9, further comprising:

a memory to store a selection table, and wherein, in the selection table, information on a clock to be used is registered for the elevator information that should be transmitted together with the time information.

11. The maintenance device according to claim 9, wherein the plurality of clocks include a first clock and a second clock, and the second clock outputs as time information an offset value for time information from the first clock.

12. The maintenance device according to claim 9, wherein the circuitry is configured to adjust a time of each of the plurality of clocks.

13. The maintenance device according to claim 9, wherein the plurality of clocks include a first clock and a second clock, and the circuitry is configured to set time information to be output from the first clock to time information received from a controller of an elevator, and set time information to be output from the second clock to time information received from an external institution that is external to the maintenance device.

14. An elevator device comprising:

a car that moves in a shaft;

a controller that controls movement of the car;

the maintenance device according to claim 9, the maintenance device being connected to the controller; and a communication device connected to the maintenance device.

15. The elevator device according to claim 14, wherein the circuitry is configured to adjust a time of each of the plurality of clocks.

16. The elevator device according to claim 14, wherein the plurality of clocks include a first clock and a second clock, and the circuitry is configured to set time information to be output from the first clock to time information received from the controller, and set time information to be output from the second clock to time information received from outside by the communication device that is external to the maintenance device.

17. A maintenance device comprising:

a plurality of clocks that each output time information; and circuitry configured to:

select one of the plurality of clocks of the maintenance device as a clock to be used according to a content of a specific operation to be performed; and start the specific operation related to a service or maintenance of an elevator according to time information from the selected clock.

18. The maintenance device according to claim 17, further comprising:

a memory to store a selection table, and wherein, in the selection table, information on a clock to be used is registered for each content of specific operations that should be started according to time information.

19. The maintenance device according to claim 17, wherein the plurality of clocks include a first clock and a second clock, and the second clock outputs as time information an offset value for time information from the first clock.

20. The maintenance device according to claim 17, wherein the circuitry is configured to adjust a time of each of the plurality of clocks.

21. The maintenance device according to claim 17, wherein the plurality of clocks include a first clock and a second clock, and the circuitry is configured to set time information to be output from the first clock to time information received from a controller of an elevator, and set time information to be output from the second clock to time information received from an external institution that is external to the maintenance device.

22. An elevator device comprising:

a car that moves in a shaft;

a controller that controls movement of the car;

the maintenance device according to claim 17, the maintenance device being connected to the controller; and a communication device connected to the maintenance device.

23. The elevator device according to claim 22, wherein the circuitry is configured to adjust a time of each of the plurality of clocks.

24. The elevator device according to claim 22, wherein, the plurality of clocks include a first clock and a second clock, and the circuitry is configured to set time information to be output from the first clock to time information received from the controller, and set time information to be output from the second clock to time information received from outside by the communication device that is external to the maintenance device.

* * * * *